US009428883B2

(12) United States Patent
Ueda et al.

(10) Patent No.: US 9,428,883 B2
(45) Date of Patent: Aug. 30, 2016

(54) CONSTRUCTION MACHINE INCLUDING AIR CLEANER

(71) Applicant: KOBELCO CONSTRUCTION MACHINERY CO., LTD., Hiroshima-shi (JP)

(72) Inventors: Yoshihiko Ueda, Hiroshima (JP); Yae Tanbo, Hiroshima (JP)

(73) Assignee: KOBELCO CONSTRUCTION MACHINERY CO., LTD., Hiroshima-shi (JP)

(*) Notice: Subject to any disclaimer, the term of this patent is extended or adjusted under 35 U.S.C. 154(b) by 0 days.

(21) Appl. No.: 14/520,746

(22) Filed: Oct. 22, 2014

(65) Prior Publication Data

US 2015/0136501 A1 May 21, 2015

(30) Foreign Application Priority Data

Nov. 20, 2013 (JP) ................................ 2013-239424

(51) Int. Cl.

*B60K 5/08* (2006.01)
*B60K 13/02* (2006.01)
*E02F 9/08* (2006.01)
*F02M 35/04* (2006.01)

(52) U.S. Cl.

CPC ........... *E02F 9/0866* (2013.01); *E02F 9/0883* (2013.01); *F02M 35/048* (2013.01)

(58) Field of Classification Search

CPC ........ B60K 5/10; B60K 5/1283; B60K 5/08; B60K 5/12; B60K 13/02; E02F 9/08; E02F 9/0808; E02F 9/00

See application file for complete search history.

(56) References Cited

U.S. PATENT DOCUMENTS

| | | | | |
|---|---|---|---|---|
| 2,400,224 A * | 5/1946 | Christensen | ......... | B60K 5/1283 165/67 |
| 4,962,825 A | 10/1990 | Albright et al. | | |
| 2010/0275588 A1* | 11/2010 | Kamata | ................ | B60K 5/1208 60/322 |

FOREIGN PATENT DOCUMENTS

| | | |
|---|---|---|
| JP | 63-48965 U | 4/1988 |
| JP | 64-60714 A | 3/1989 |
| JP | 3-63736 U | 6/1991 |
| JP | 11-229432 A | 8/1999 |

(Continued)

OTHER PUBLICATIONS

Extended European Search Report issued Apr. 13, 2015 in Patent Application No. 14190607.3.

(Continued)

*Primary Examiner* — Bryan Evans

(74) *Attorney, Agent, or Firm* — Oblon, McClelland, Maier & Neustadt, L.L.P.

(57) ABSTRACT

Provided is a construction machine including an air cleaner and allowing the air cleaner to be easily installed with no enlargement of an installed space while surely avoiding the interference with other structure. The construction machine includes: an air cleaner; a pipe connected to an exhaust port of the air cleaner; a seat plate on which the air cleaner and the pipe are mounted to form a subassembly; and a device including an upper surface on which the subassembly is mounted to form a device-assembly. The subassembly is allowed to be displaced between a first position apart from a first structure and a second position close to the first structure and apart from a second structure and to be fixed at each of the positions.

7 Claims, 8 Drawing Sheets

(56) References Cited

FOREIGN PATENT DOCUMENTS

| | | | |
|---|---|---|---|
| JP | 2001-311180 | A | 11/2001 |
| JP | 2003-184670 | | 7/2003 |
| JP | 2005-280683 | A | 10/2005 |
| JP | 2011-220033 | A | 11/2011 |
| WO | WO 2009/142058 | A1 | 11/2009 |

OTHER PUBLICATIONS

Office Action issued Sep. 8, 2015 in Japanese Patent Application No. 2013-239424 (with English summary of the Office Action).

* cited by examiner

CONSTRUCTION MACHINE INCLUDING AIR CLEANER

TECHNICAL FIELD

The present invention relates to a construction machine including an air cleaner.

BACKGROUND ART

There is conventionally known a construction machine including an engine and an air cleaner connected to the engine via a pipe. Thus provided air cleaners and pipes thereof for construction machines are disclosed in Japanese Utility Model Application Laid-open No. S63-48965. The air cleaner and the pipe therefor are often interposed between a plurality of obstacles within a limited space in the construction machine, as shown in Japanese Utility Model Application Laid-open No. S63-48965; hence, desired is an art which enables the installation thereof to be efficiently performed.

SUMMARY OF INVENTION

An object of the present invention is to provide a construction machine including an air cleaner and a pipe therefor, the construction machine allowing the air cleaner and the pipe to be efficiently installed while they are interposed between a plurality of obstacles.

Provided by the present invention is a construction machine including: an engine; an air cleaner having an exhaust port and configured to filter air taken in by the engine; a pipe connected to the exhaust port of the air cleaner; a seat plate on which the engine, the air cleaner and the pipe are mounted to form a subassembly; a device including an upper surface on which the subassembly is mounted, the device being configured to form, in cooperation with the installed subassembly, a device-assembly to be installed in a predetermined installation space; a fixing member for fixing the subassembly to the device. One of the seat plate and the surface of the device is provided with an aperture extending in a specific length direction and the other of the seat plate and the surface of the device is provided with a fit-in portion to be fitted into the aperture so as to be capable of relative displacement to the aperture in the length direction. The length direction is such a direction that the relative displacement of the fit-in portion to the aperture in the length direction allows the subassembly to be displaced between a first position and a second position, the first position being farther from a first structure, which is an obstacle to the installation of the subassembly into the installation space, and being closer to a second structure other than the first structure, than the second position. The fixing member has both of a first fixing mode of fixing the subassembly to the device at the first position and a second fixing mode of fixing the subassembly to the device at the second position.

DESCRIPTION OF EMBODIMENTS

Figure 1:
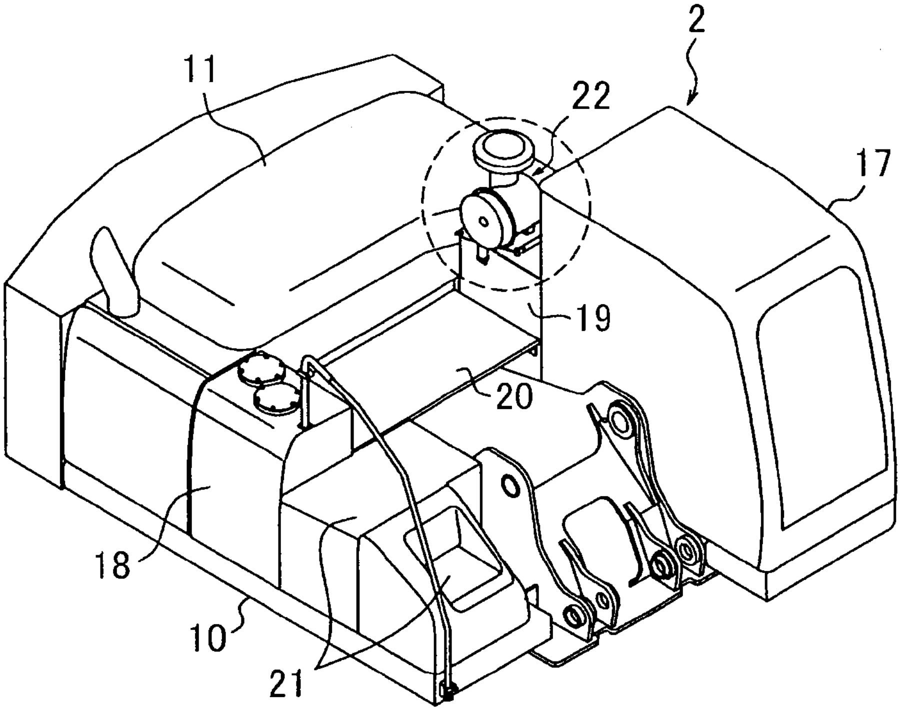
FIG. 1 is a perspective view of an upper slewing body of an excavator according to an embodiment of the present invention.
Figure 2:
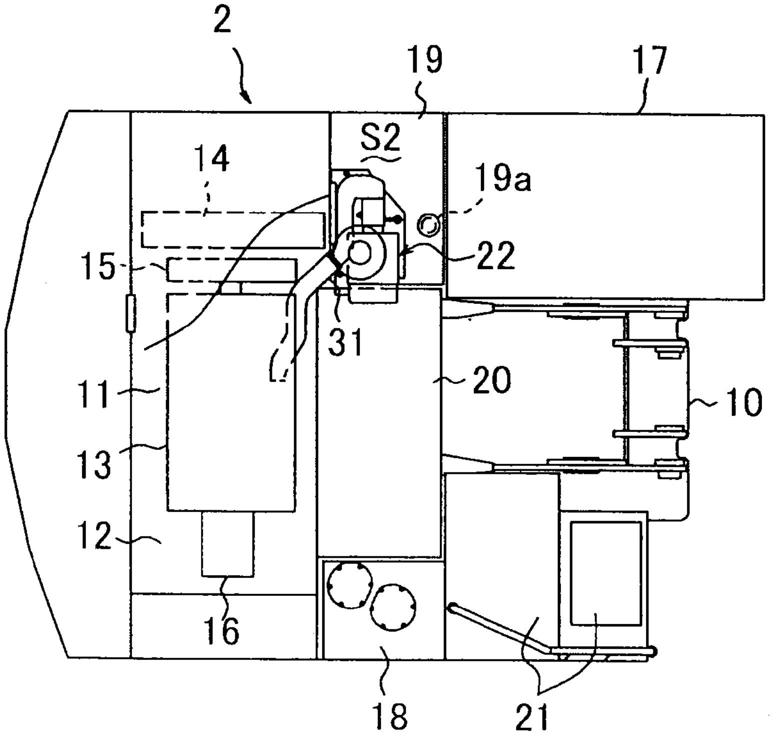
FIG. 2 is a plan view of the upper slewing body.

Embodiments of the present invention will be described. In advance of the description about the embodiments, explained is an excavator according to a comparative example virtually assumed for describing the embodiments, with reference to FIGS. 11 to 14.

The excavator includes a crawler-type lower travelling body 1, an upper slewing body 2 mounted on the lower travelling body 1 slewably about an axis perpendicular to the ground, and a working attachment 9 loaded on a front portion of the upper slewing body 2. The attachment 9 has a boom 3, an arm 4, a bucket 5, and a plurality of cylinders, namely, a boom cylinder 6, an arm cylinder 7 and a bucket cylinder 8, which operate the boom 3, the arm 4 and the bucket 5, respectively.

The upper slewing body 2 has an upper frame 10 as a base, and various devices and equipment which are mounted on the upper frame 10. Specifically, on the upper frame 10 are mounted an engine room 12 and a cabin 17. The engine room 12 is provided on a rear portion of the upper frame 10, having a bonnet 11 adapted to open and close an opening which faces upward. In the engine room 12, there are installed an engine 13 as a power source, and related equipment of the engine 13, namely, a radiator 14, a cooling fan 15, a hydraulic pump 16, etc. The cabin 17 is installed forward of the engine room 12, and at one of right and left sides (usually, at the left side; hereinafter, the description will be based on this assumption). In the present specification, "front and rear" and "right and left" are directions from the viewpoint of an operator who is seated in the cabin 17.

Figure 12:
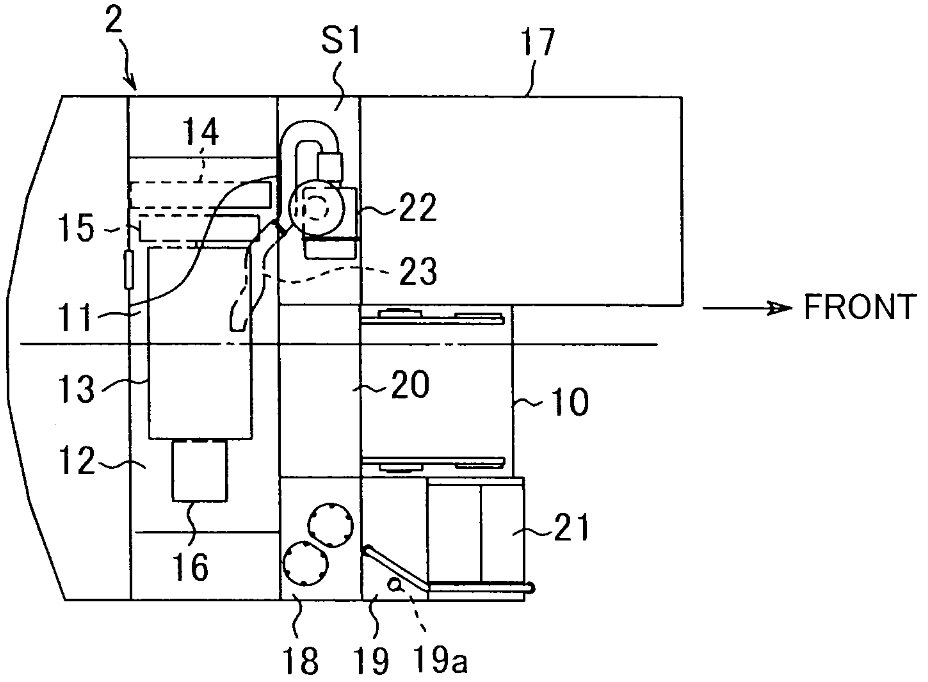
FIG. 12 is a schematic plan view of the excavator shown in FIG. 11.

In the upper frame 10, there are further provided a hydraulic tank 18, a fuel tank 19, a center foothold 20, and a climbing step 21. The hydraulic tank 18 is placed on an opposite side to the cabin 17 with respect to the right and left direction (usually, at the right side) in the upper frame 10, and located forward of the engine room 12, and accumulates hydraulic fluid. The fuel tank 19 is arranged with the hydraulic tank 18 in the front and rear direction, and accumulates a fuel. The fuel tank 19 includes an oil feeding portion 19*a* with an oil feeding port. The center foothold 20 is provided on a widthwise intermediate portion of the upper frame 10 immediately forward of the engine room 12, in order to allow maintenance of devices including the engine 13 in the engine room to be performed. The climbing step 21 is disposed forward of the fuel tank 19 and formed into a stair shape for guiding a maintenance person to the center foothold 20. Thus formed is a path for maintenance which reaches the center foothold 20 through the climbing step 21 and the upper surface of the fuel tank 19. FIG. 12 indicates a thick line surrounding the path and the center foothold 20 to distinguish them from other parts.

Over the upper frame 10, there are arranged an air cleaner 22 and an air intake piping unit 23. The air cleaner 22 is placed, for example, between the engine room 12 and the cabin 17 at the left side of the upper frame 10, in order to filter engine intake air. The air intake piping unit 23 interconnects the air cleaner 22 and an air suction port of the engine 13.

Figure 13:
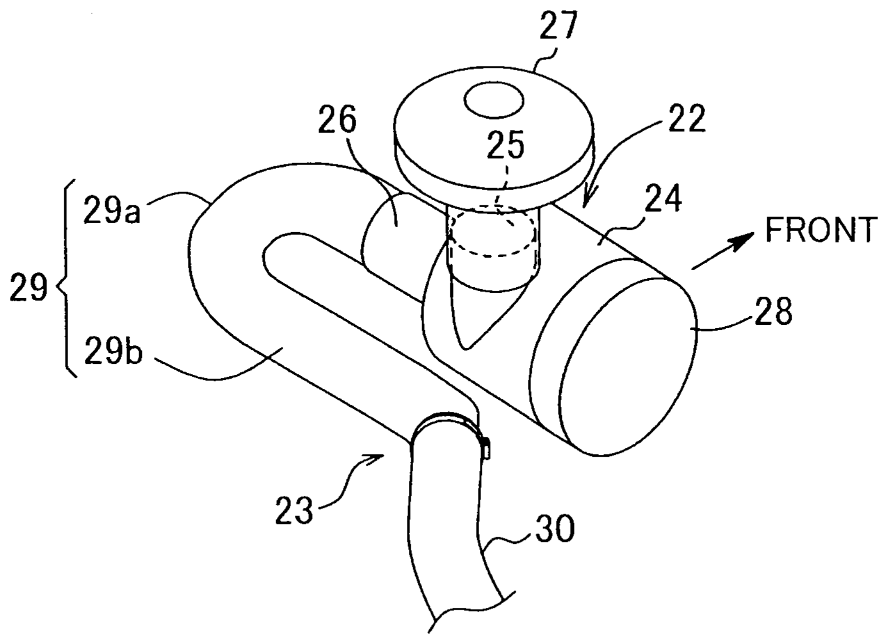
FIG. 13 is a perspective view of an air cleaner and a pipe of the excavator shown in FIG. 12.
Figure 14:
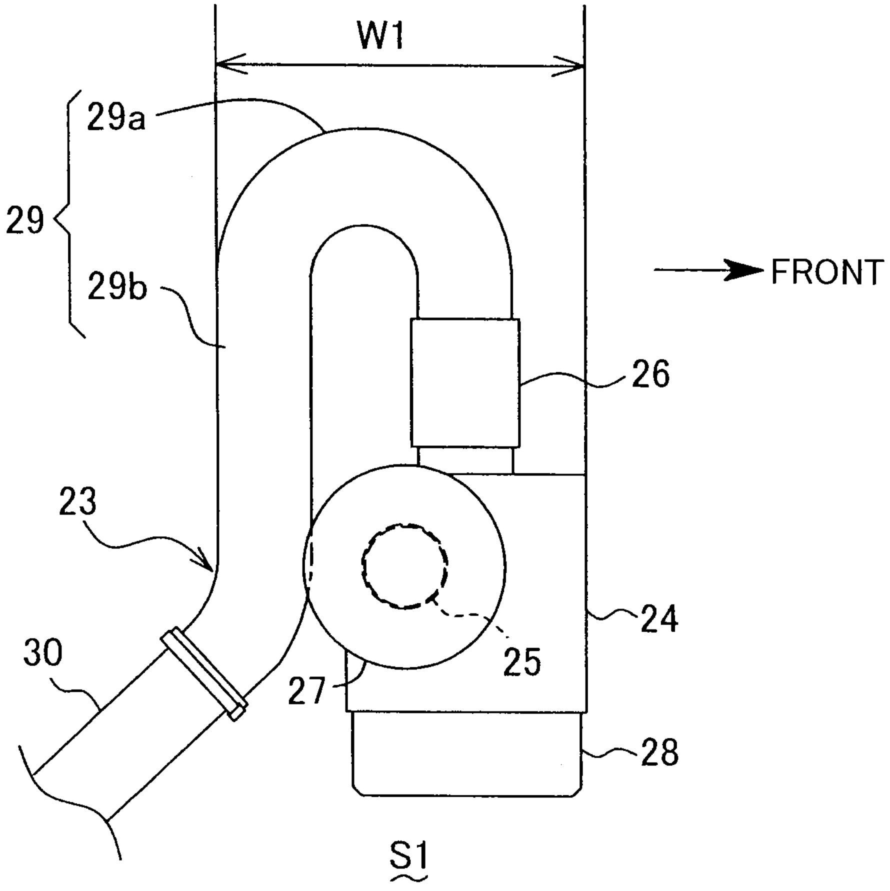
FIG. 14 is a plan view of the air cleaner and the pipe of the excavator shown in FIG. 12.

The air cleaner 22 has a configuration shown in FIGS. 13 and 14.

As disclosed in Japanese Patent Application Laid-open No. 2003-184670, the air cleaner 22 includes a main body 24 having a cylindrical outer peripheral surface and accommodating a filter, an air intake portion 25 having an air intake port and protruding upward beyond the outer peripheral surface of the main body 24, a cylindrical exhaust portion 26 having an exhaust port and provided at one end side of the main body 24, and an end cover 28 provided on the other end side of the main body 24 and being detachable to allow the filter to be taken in and taken out. An air intake cylinder 27 and the air intake piping unit 23 are connected to the air intake portion 25 and the exhaust portion 26, respectively.

It is desirable to perform the maintenance of the air cleaner 22 (take-in and take-out of the filter) at the center foothold 20 from the aspect of working efficiency and safety; hence, the air cleaner 22 is usually oriented in such a posture that the end cover 28 faces the center-foothold-20 side while an exhaust port of the exhaust portion 26 faces the opposite side to the center foothold 20, i.e., to the outside of the machine body.

The air intake piping unit 23 includes an air-cleaner-side pipe 29 and an engine-side pipe 30. The air-cleaner-side pipe 29 is arranged in an air cleaner installation space S1, having a basal end portion which is connected to the exhaust port of the air cleaner 22. The engine-side pipe 30 is arranged in the engine room 12 over substantially the whole length of the engine-side pipe 30, interconnecting the air-cleaner-side pipe 29 and the air intake port of the engine 13. Specifically, the engine-side pipe 30 has a distal end portion which is connected to the air intake port of the engine 13.

Since the exhaust port of the exhaust portion 26 of the air cleaner 22 is connected to the air-cleaner-side pipe 29 and faces the side opposite to the engine 13, the air-cleaner-side pipe 29 includes a returning portion **29*a* which returns in a U-shape as shown in the drawings. Across the returning portion 29*a*, an end portion at one side of the air-cleaner-side pipe 29 forms a basal end portion which is connected to the exhaust port of the exhaust portion 26 and an end portion at the other side of the air-cleaner-side pipe 29 forms the distal end portion which is connected to the engine-side pipe 30. Specifically, the air-cleaner-side pipe 29 includes the returning portion 29*a* and a straight-line portion 29*b* which extends horizontally and linearly from the distal end of the returning portion 29*a* to the engine 13 (the engine-side pipe 30) side along the air cleaner 22, at the side opposite to the basal end portion which is connected to the exhaust portion 26. The sum of respective front-rear sizes of the air cleaner 22 and the air-cleaner-side pipe 29 corresponds to a substantial air-cleaner width size W1 as shown in FIG. 14. The installation space S1 is, therefore, required to have a front-rear size no less than the air-cleaner width size W1. In here, if the air cleaner 22 was oriented so that the exhaust port of the air cleaner 22 faces the engine side, the width size W1 of the air cleaner could be reduced because of no need for the returning portion 29*a* of the air-cleaner-side pipe 29. This case, however, involves making the end cover 28** face the outside of the machine body, which requires the maintenance operation of taking in and taking out of the filter to be performed at a high place at the outside of the machine body: this is not advisable from the aspect of safety and working efficiency.

On the other hand, excavator are required to receive installation of additional equipment, such as a liquid reducing-agent tank for accumulating a reducing agent for reducing and purifying the exhaust gas and a large-sized battery following hybridization of machines, within the limited space thereof.

As means for space utilization, there can be considered arrangement of the air cleaner 22 in the installation space S1 in the state in which the air cleaner 22 is installed on the upper surface of other equipment such as the fuel tank 19 (three-dimensional arrangement), for example. Specifically, as a desirable procedure of assembling and installing, it would be possible to take the procedure of installing the air cleaner 22 and the air-cleaner-side pipe 29 on the fuel tank upper surface in advance, and then installing the device-assembly consisting of the three items of the fuel tank, the cleaner 22, and the air-cleaner-side pipe 29 into the installation space S1.

In this case, because the oil filling part **19*a* protrudes from the upper surface of the fuel tank 19, the air cleaner 22 needs to be installed on the fuel tank upper surface by separating the air cleaner 22 from the oil filling part 19*a* so as not to interrupt the oil filling and the like. Practically, the oil filling part 19*a* needs to be provided at a front part of the fuel tank upper surface, and the air cleaner 22** needs to be installed at a rear part of the fuel tank upper surface.

However, this arrangement brings the air-cleaner-side pipe 29 into a position close to a structure which is positioned at the rear side thereof. Specifically, when the engine room 12 has a front wall, the air-cleaner-side pipe 29 will be close to the front wall. When the engine room 12 has no front wall, the air-cleaner-side pipe 29 will be close to the equipment in the engine room (i.g., the radiator 14). This generates a possibility of interference of the air-cleaner-side pipe 29 with the radiator 14 which can damage the air-cleaner-side pipe during the installation of the device-assembly into the installation space S1. Avoiding this interference requires an extremely careful installing operation. This operation is troublesome, further involving a risk of damaging the air-cleaner-side pipe 29.

This problem could be solved by increasing the size in the front-rear direction of the installation space S1 to a size large enough to involve no risk of the interference; the size-increase, however, causes the loss of the space-utilization effect. Even the arrangement of the air-cleaner-side pipe 29 along a path forward of the air cleaner 22 cannot solve the problem because it allows the air cleaner 22 to interfere with the radiator 14.

The excavator according to the embodiment of the present invention solves the above problems. The embodiment will be described with reference to FIGS. 1 to 10. In the embodiment, the present invention is applied to an excavator, which has a common configuration with the excavator according to the comparative example shown in FIGS. 11 to 14, in the following points.

Specifically, the excavator includes a not-graphically shown crawler-type lower travelling body, an upper slewing body 2 mounted on the lower travelling body 1 slewably about an axis perpendicular to the ground. The upper slewing body 2 has an upper frame 10 as a base, on which various devices and equipment are mounted. The various devices and equipment include an engine room 12, an engine 13 as a power source, related equipment of the engine 13, a cabin 17, a plurality of tanks including a hydraulic oil tank 18 and a fuel tank 19, a center foothold 20, and a climbing step 21. The engine room 12 is provided on a rear portion of the upper frame 10, designed to be opened and closed by a bonnet 11. The engine 13 and the related equipment are housed in the engine room 12. The related equipment includes a radiator 14, a cooling fan 15, and a hydraulic pump 16. The cabin 17 is disposed on a front side and the left side of the engine room 12. The hydraulic oil tank 18 is a tank which accumulates hydraulic oil. The hydraulic oil tank 18 is provided at a position on the opposite side to the cabin 17 with respect to the left and right direction in the upper frame 10, i.e., at the right side, and forward of the engine room 12. The center foothold 20 is used for maintenance of devices including the engine 13 in the engine room 12, and is provided immediately forward of the engine room 12 and on a widthwise intermediate portion of the upper frame 10. The climbing step 21 is formed into a stair shape to guide the maintenance person to the center foothold 20, and is disposed forward of the hydraulic oil tank 18.

Figure 11:
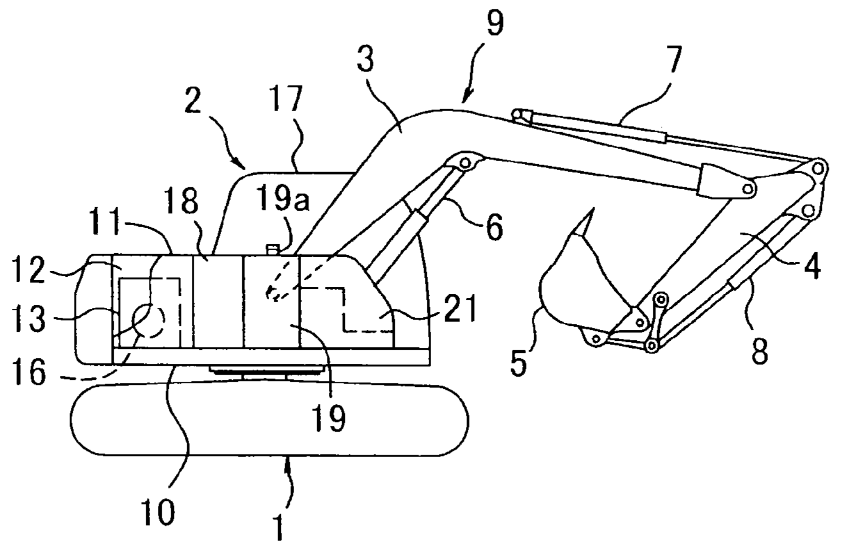
FIG. 11 is a schematic side view of an excavator according to a comparison example for explaining the present invention.

The fuel tank 19 is a tank which accumulates the fuel. In the present embodiment, the fuel tank 19 is placed in an installation space S2 defined between the cabin 17 and the engine room 12 over the upper frame 10, allowing an air cleaner 22, which filters the intake air of the engine, to be placed on the fuel tank 19. In other words, while both of the hydraulic oil tank 18 and the fuel tank 19 in the comparative example shown in FIGS. 11 and 12 are collected at the right side of the upper frame, the hydraulic oil tank 18 and the fuel tank 19 in the present embodiment are distributed on the right and left sides on the upper frame 10, respectively, and the air cleaner 22 is superposed on the fuel tank 19, that is, arranged three-dimensionally. The present arrangement enables an empty space forward of the hydraulic oil tank 18, that is, below the climbing step 21, to be produced, thus allowing other equipment (either one of or both of a liquid reducing-agent tank and a battery for hybrid machines, for example) to be installed in the produced space.

The fuel tank 19 has an oil feeding portion 19*a* being located at a front part of the fuel tank 19 and having an oil filling port. The air cleaner 22 is placed at a rear portion of the fuel tank 19, i.e., at a portion near the engine room, at a distance from the oil feeding portion 19*a*.

The air cleaner 22 has a configuration similar to that of the air cleaner 22 shown in FIGS. 12 to 14. As specifically shown in FIGS. 3 to 9, the air cleaner 22 includes: a main body 24 accommodating a not-graphically-shown filter and having a cylindrical outer peripheral surface; an air intake portion 25 protruding upward beyond the outer peripheral surface of the main body 24 and having an air intake port; an exhaust portion 26 provided at one axial-end side of the main body 24 and having an exhaust port; an air intake cylinder 27 connected to the air intake port; an air intake piping unit 31 connected to the exhaust port; and an end cover 28.

It is desirable that the maintenance of the air cleaner 22, that is, take-in and take-out of the filter, is performed at the center foothold 20 for the sake of working efficiency and safety; hence, the air cleaner 22 is oriented so that the end cover 28 faces the center foothold 20 side while the exhaust port of the exhaust portion 26 faces the opposite side, that is, the outside of the machine body.

The end cover 28 is configured to be attached and detached with respect to the other end side of the main body 24 for taking in and taking out the not-graphically-shown filter. The end cover 28 is attached with an evacuator 28*a* for discharging dusts from the air cleaner 22, so as to make the evacuator 28*a* protrude downward beyond an under surface of the end cover 28.

The air intake piping unit 31 includes an air-cleaner-side pipe 32 and an engine-side pipe 33. The air-cleaner-side pipe 32 is arranged in the installation space S2, having a basal end portion which is connected to the exhaust port of the exhaust portion 26 of the air cleaner 22. The engine-side pipe 33 is arranged so as to locate a portion of substantially the whole length thereof in the engine room 12. The engine-side pipe 33 has a distal end portion which is connected to the air intake port of the engine 13. The engine-side pipe 33, thus, interconnects the air-cleaner-side pipe 32 and the air intake port of the engine 13.

The exhaust port of the air cleaner 22, to which the distal end portion of the air-cleaner-side pipe 32 is connected, faces a side opposite to the engine 13: hence, the air-cleaner-side pipe 32 has a portion returning in a U-shape as shown in the drawings, wherein the basal end portion as one end portion out of the end portions at both sides of the returning portion is connected to the exhaust port of the exhaust portion 26 while the distal end portion as the other end portion out of the end portions is connected to the engine-side pipe 33. In detail, the air-cleaner-side pipe 32 includes: the basal end portion which is connected to the exhaust port of the exhaust portion 26; a returning portion 32*a* having a shape of returning so as to extend from the basal end portion to the outer-periphery side of the air cleaner 22 toward the engine 13 side; and a straight-line portion 32*b* as a downstream-side portion which extends from a distal end of the returning portion 32*a* along the air cleaner 22 linearly and horizontally to the engine-13 side and the engine-side-pipe-30 side.

The excavator further includes a seat plate 34. The seat plate 34 includes an upper surface on which the air cleaner 22 and the air-cleaner-side pipe 32 are mounted. Thus formed are a subassembly A1 including the air cleaner 22, air-cleaner-side pipe 32 and the seat plate 34, namely, an air-cleaner assembly. The subassembly A1 including the seat plate 34 can be mounted on the upper surface of the fuel tank 19, thus forming a device-assembly A2 including the subassembly A1 and the fuel tank 19. The entire device-assembly A2 is installed in the installation space S2.

Next will be specifically described the subassembly A1 and the device-assembly A2.

The seat plate 34 is a plate body formed of a metal or plastic and has a shape and an area which are necessary and sufficient for mounting the air cleaner 22 and the air-cleaner-side pipe 32 on the plate body. The air cleaner 22 and the air-cleaner-side pipe 32 connected to the air cleaner 22 are mounted and fastened on the seat plate 34, for example, with a bolt.

Figure 7:
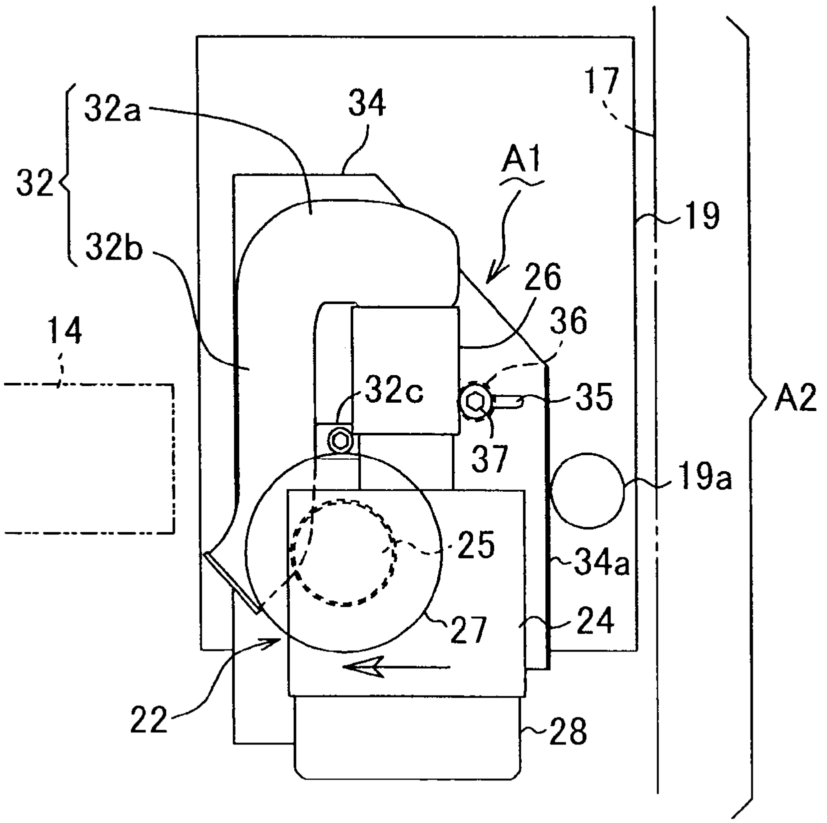
FIG. 7 is a plan view showing the state shown in FIG. 4.
Figure 8:
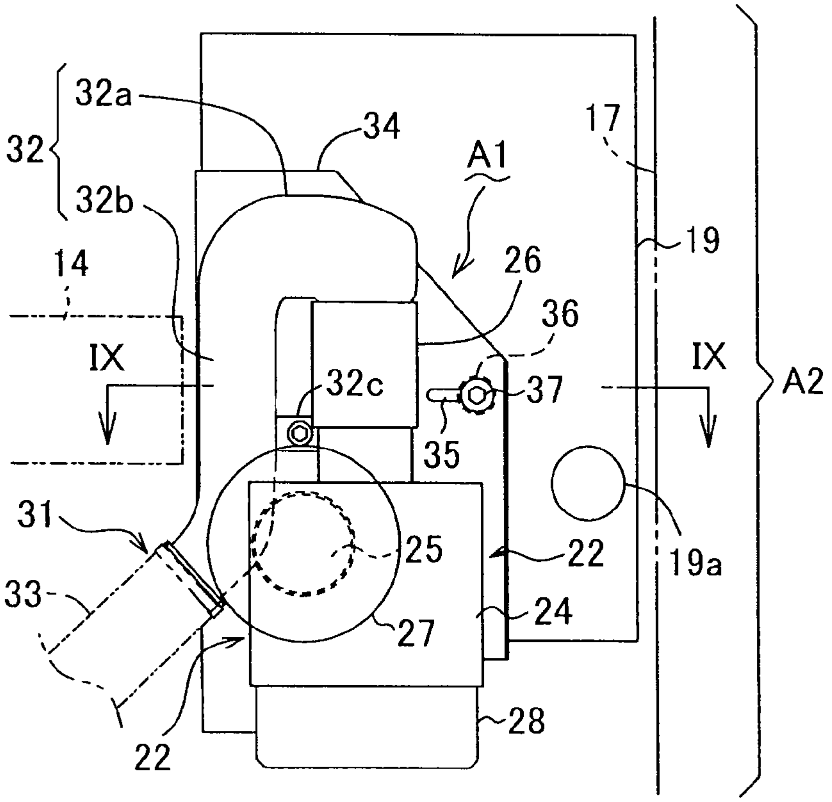
FIG. 8 is a plan view showing the state shown in FIG. 5.
Figure 10A:
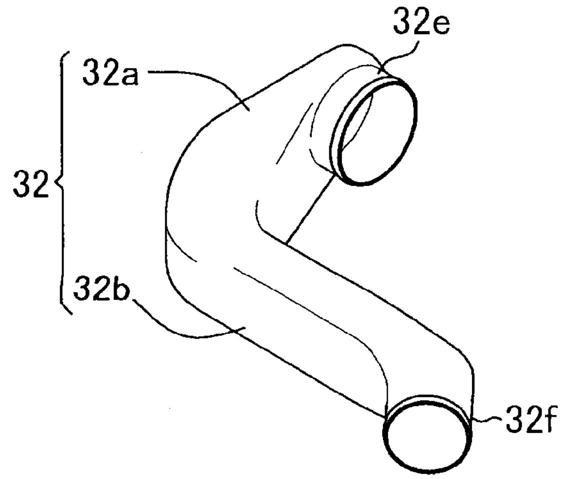
FIG. 10A and FIG. 10B are perspective views each showing a pipe constituting the subassembly.
Figure 10B:
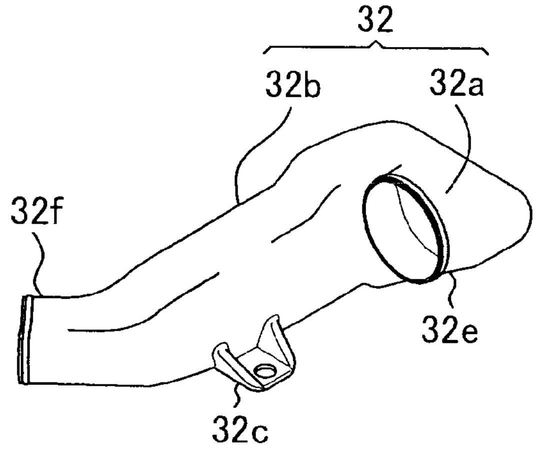

The air-cleaner-side pipe 32 includes a fitting seat 32*c* shown in FIGS. 7, 8, and 10B. The fitting seat 32*c* protrudes beyond the side surface of the straight line portion 32*b* integrally with the straight line portion 32*b* of the air-cleaner-side pipe 32. By fastening the fitting seat 32*c* to the seat plate 34 with the bolt, the air-cleaner-side pipe 32 is mounted to the seat plate 34. It may be permitted to similarly mount a plurality of portions of the air-cleaner-side pipe 32 on the seat plate 34.

The air cleaner 22 is fastened to the seat plate 34 at a plurality of positions with respective bolts, while the structure for mounting the air cleaner 22 is not graphically shown, for simplification of the drawings.

Figure 3:
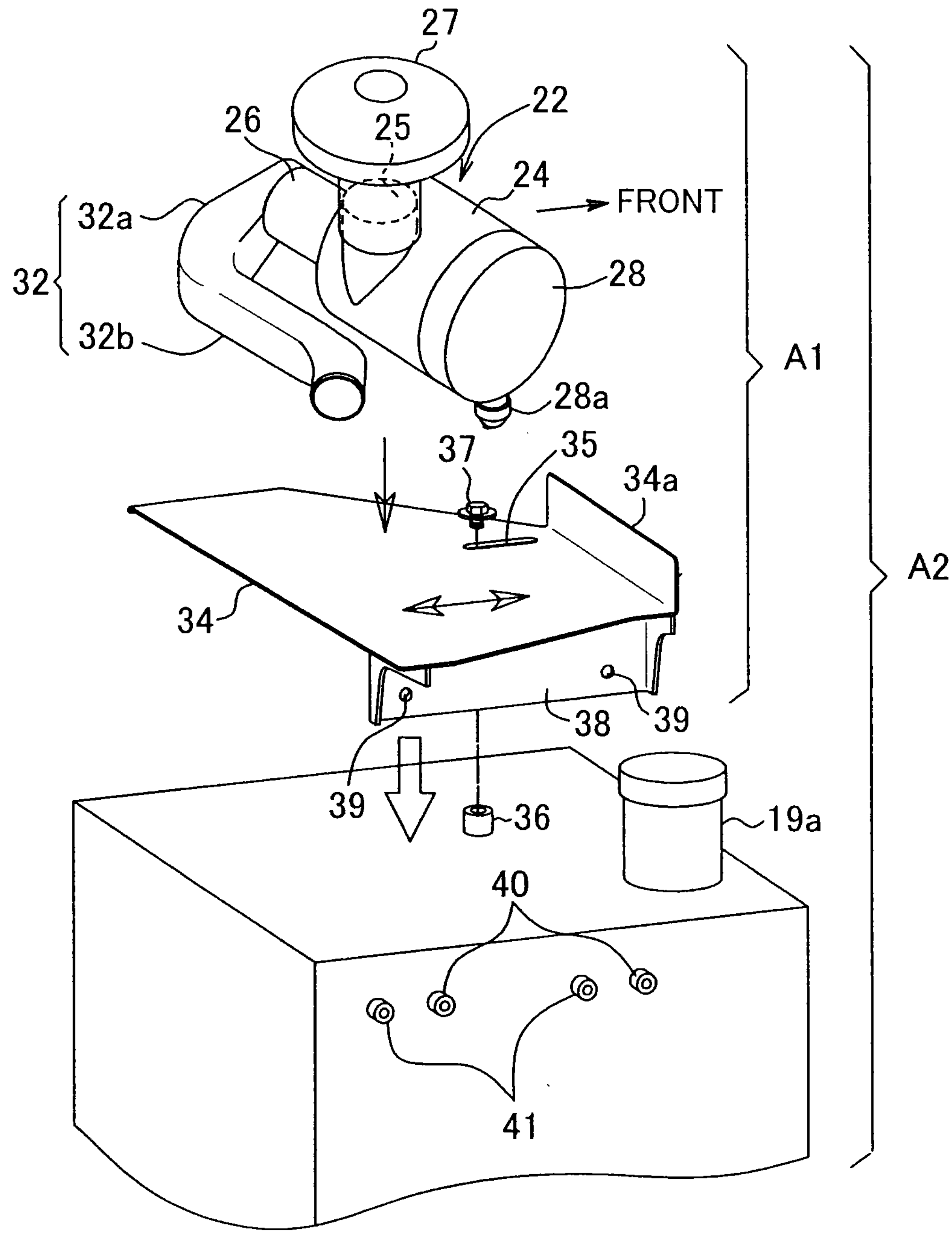
FIG. 3 is an exploded perspective view of a device-assembly of the excavator.
Figure 4:
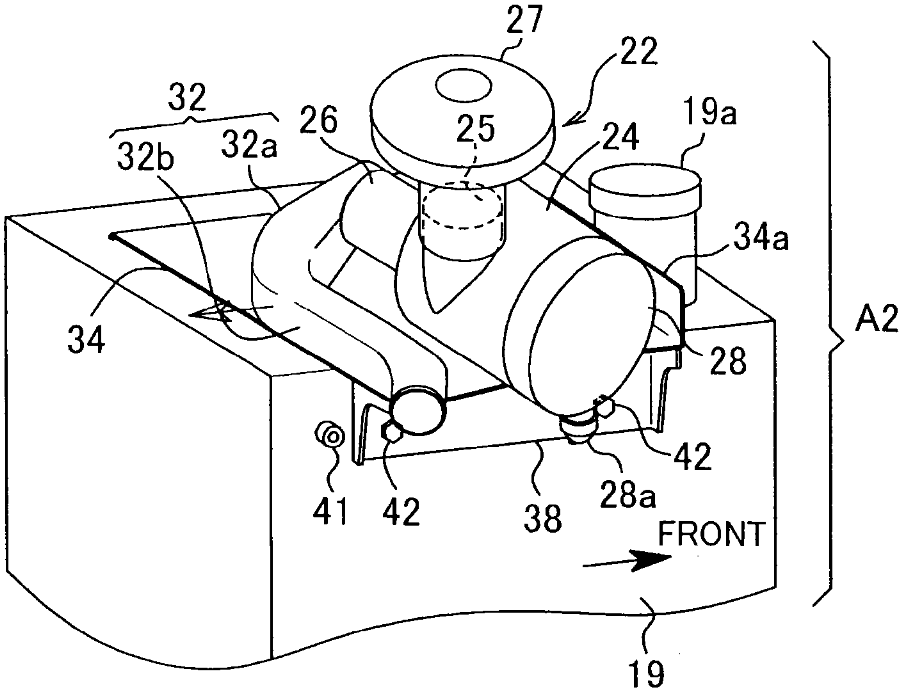
FIG. 4 is a perspective view showing a state of mounting a subassembly included in the device-assembly on an upper surface of a fuel tank at a first position.
Figure 5:
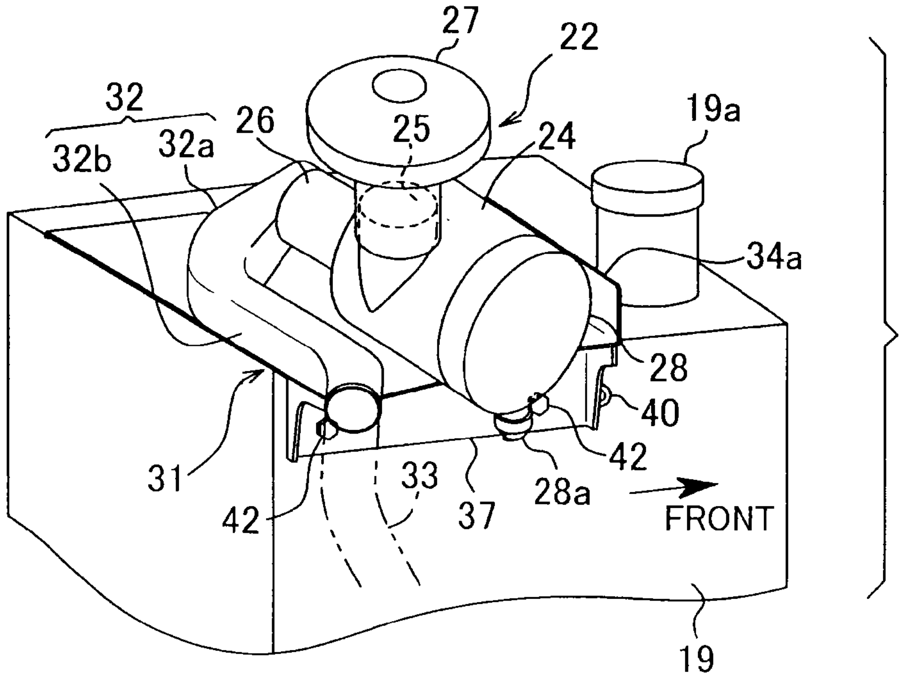
FIG. 5 is a perspective view showing a state where the subassembly has been displaced to the second position.

The seat plate 34 is provided with an aperture, specifically, a long-hole 35 which is long in the front-rear direction as shown in FIGS. 3, 7, and 8. The fuel tank 19 is provided with a cylindrical boss 36 having a screwed hole, on an upper surface of the fuel tank 19, the boss 36 protruding vertically beyond the upper surface. For fixing the seat plate 34, used is a bolt 37 which constitutes a fixing member and serves as a fit-in portion. The bolt 37 is screwed into the boss 36 through the long-hole 35 to thereby constrain the entire subassembly A1 including the seat plate 34 to the upper surface of the fuel tank 19 while permitting a relative displacement of the subassembly A1 to the fuel tank 19 in the front-rear direction within the range in the longitudinal direction of the long-hole 35. The bolt 37, thus, can permit the subassembly A1 to be displaced between: a first position apart from the radiator 14 as a first structure which becomes an obstacle to the installation of the device-assembly A2 into the installation space S2 as shown in FIGS. 4 and 7 and close to the oil filling portion 19*a* as a second structure; and a second position apart from the oil filling part 19*a* by a distance which prevents the subassembly A1 from hindering the use of the oil filling part 19*a* as shown in FIGS. 5 and 8 and close to the radiator 14. The bolt 37 is able to fix the subassembly A1 at each of the first and second positions. Specifically, the bolt 37 has a first fixing mode of fixing the subassembly A1 to the fuel tank 19 at the first position, and a second fixing mode of fixing the subassembly A1 to the fuel tank 19 at the second position, wherein, the subassembly A1 is farther from the radiator 14 and closer to the oil feeding portion 19*a* when located at the first position than when located at the second position.

The front end portion of the seat plate 34 forms an air-cleaner guard portion 34*a* which protrudes upward beyond the other portion. The air-cleaner guard portion 34*a* and the oil filling part 19*a* restrict a forward position of the seat plate 34 and prevent the air cleaner 22 and the oil filling part 19*a* from collision to each other.

Figure 6:
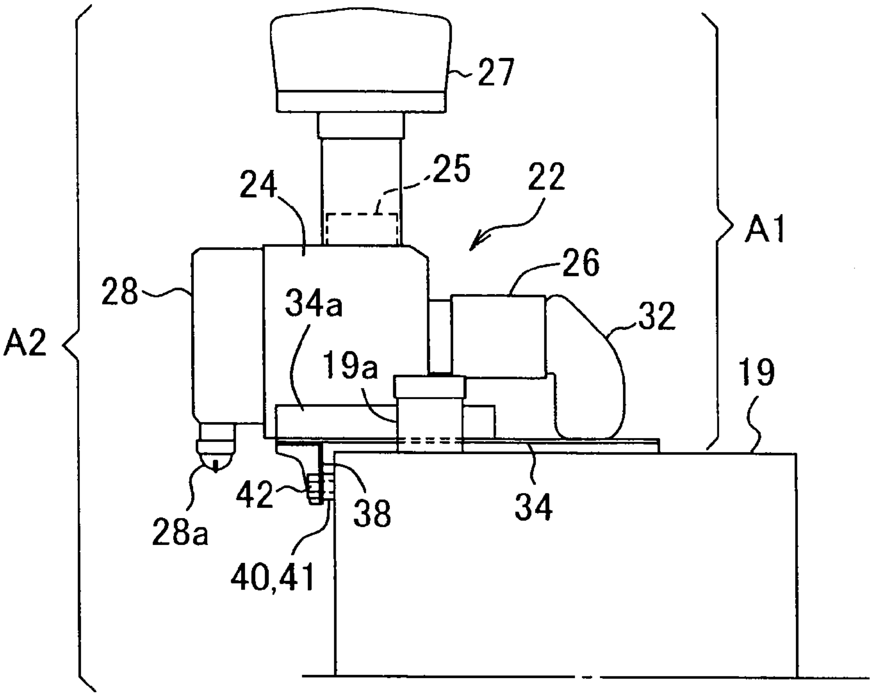
FIG. 6 is a front view showing the state shown in FIG. 5.

The subassembly A1 is mounted at such a position that the evacuator 28*a* protrudes from the upper surface of the fuel tank 19 to the right side as shown in FIG. 6 so as to prevent dusts dropped from the evacuator 28*a* of the air cleaner 22 from falling onto the upper surface of the fuel tank 19. Corresponding to this, a side bracket 38 is mounted on the lower surface of the right side end part of the seat plate 34, the part protruding from the upper surface of the fuel tank 19. The side bracket 38 includes a horizontal wall and a vertical wall extending downward from one end of the horizontal wall, mounted to the seat plate 34 by welding or the like so as to extend along the displacement direction of the subassembly A1, i.e., the front-rear direction. Specifically, the horizontal wall of the side bracket 38 is mounted to the seat plate 34, while the vertical wall is provided with through-holes 39, 39 shown in FIG. 3, for example, at respective front and rear sides of the vertical wall.

On the other hand, as shown in FIG. 3 and the like, the upper part of the right side surface of the fuel tank 19 is provided with two spaced cylindrical first bosses 40 and two spaced cylindrical second bosses 41 in correspondence to the bolt through-holes 39. As shown in FIG. 4, when the subassembly A1 is at the first position, respective fixing bolts 42 can be screwed into the first bosses 40; as shown in FIG. 5, when the subassembly A1 is at the second position, the respective fixing bolts 42 can be screwed into the second bosses 41. Thus, the subassembly A1 can be fixed to the fuel tank 19 at any one of the first and second positions.

In this structure, the side bracket 38 can support the part of the subassembly A1 (particularly, the seat plate 34) which part protrudes to the right side from the upper surface of the fuel tank 19, at the lower side thereof. Furthermore, the use of the bolt 37 and the fixing bolts 42 allows the subassembly A1 to be more securely fixed.

The mounting of the subassembly A1 and the installation of the device-assembly A2 are performed, for example, in the following procedure.

(i) The air cleaner 22 and the air-cleaner-side pipe 32 are mounted on the seat plate 34, thereby forming the subassembly A1.

(ii) The subassembly A1 is mounted the upper surface of the fuel tank 19, thereby forming the device-assembly A2. At the stage of (i), the subassembly A1 is placed at the first position in FIGS. 4 and 7 and, if necessary, fixed by the bolt 37. At the stage of (ii), the subassembly A1 is fixed or provisionally fixed by at least one of the bolt 37 and the fixing bolts 42, 42.

(iii) The device-assembly A2 is lifted, for example, by the crane and to be installed into the installation space S2, and the air-cleaner-side pipe 32 is connected to the engine side pipe 33. During this installation, the device-assembly A2 can be reliably prevented from interference with the radiator 14 by respective sizes predetermined so as to locate the seat plate 34 and the air-cleaner-side pipe 32 of the subassembly A1 apart from the radiator 14 with a sufficient distance as shown in FIG. 7. The mounting of the air cleaner 22 and the air-cleaner-side pipe 32 to the seat plate 34 may be performed following the finish of mounting of the seat plate 34 onto the upper surface of the fuel tank 19.

Next will be described a configuration of the air-cleaner-side pipe 32 and a structure for arrangement thereof.

Figure 9:
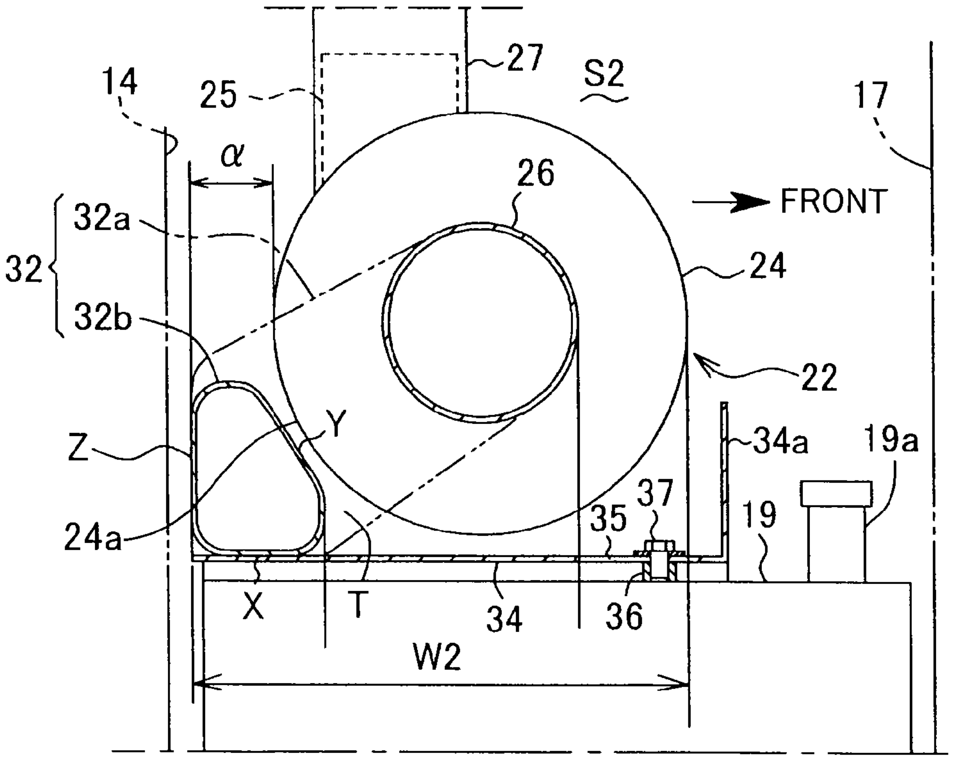
FIG. 9 is an enlarged view of a cross section along the line IX-IX in FIG. 8.

The straight-line portion 32*b* of the air-cleaner-side pipe 32 has a cross section shaped into an approximately right-angled triangular, as shown in FIG. 9, including a horizontal bottom side portion X, a vertical side portion Z extending vertically upward from one end of the opposite ends of the horizontal bottom side portion X, the one end being opposite to the air cleaner 22, a hypotenuse portion Y interconnecting the upper end of the vertical side portion Z and the other end of the opposite ends of the horizontal bottom side portion X, i.e., the end being closer to the air cleaner 22, and respective corner portions which connect mutually adjacent side parts, each corner portion being rounded. The straight-line portion 32*b* is arranged so as to locate at least a part of the hypotenuse portion Y in a space T vertically sandwiched between a cylindrical outer peripheral surface 24*a* of the air cleaner main body 24 and the upper surface of the setting plate 34, as shown in FIG. 9.

The exhaust port of the exhaust portion 26 of the air cleaner 22 has a circular cross section, and a basal end portion 32*e* (FIG. 10) of the returning portion 32*a*, the basal end portion 32*e* adapted to be connected to the exhaust port, has a circular cross section corresponding to the cross section of the exhaust port; meanwhile, the distal end portion of the returning portion 32*a*, joined to the straight-line portion 32*b*, is required to have a cross section which matches the cross section of the straight-line portion 32*b*, that is, the right-angled triangular cross section, shown in FIG. 7. However, sudden change in the shape of the cross section of the returning portion 32*a*, which has an original large airflow resistance due to the returning of the pipe line, from a circle to a right-angled triangle with an extreme reduction in the cross-sectional area involves a problem of excessively increasing the airflow resistance of the returning portion 32*a* to lower the aeration performance.

For the reason, the returning portion 32*a* according to the present embodiment is given a shape of the cross section which gradually changes from a circle to an approximately right-angled triangle by keeping a substantially constant area from the basal end portion 32*e* to the distal end portion of the returning portion 32*a*. Furthermore, the returning portion 32*a* does not have a simple arc curved shape, but has a shape in which the basal end portion 32*e* opens toward the exhaust port of the exhaust portion 26 and the returning portion 32*a* linearly extends from the basal end portion 32*e* to the air-cleaner-outer-periphery side to reach the straight-line portion 32*b*, as shown in the drawings.

The thus shaped air-cleaner-side pipe 32 can be manufactured as a molded product involving the integration of the returning portion 32*a* and the straight-line portion 32*b* with each other, by injection molding and the like using plastics and rubber as raw materials. Alternatively, the air-cleaner-side pipe 32 can be manufactured by casting using a metal material.

The straight-line portion 32*b* has a distal end portion 32*f*, which is the opposite end portion to the returning portion 32*a* and adapted to be connected to the engine-side pipe 33. The distal end portion 32*f* has a circular cross section corresponding to the circular cross section of the engine-side pipe 33, as shown in FIGS. 10A and 10B. The distal end side of the straight-line portion 32*b*, originally having little bending and has small airflow resistance, is permitted to have a direct change in the shape of the cross section from an approximate triangle to a circle.

The present configuration enables the following effects to be obtained.

(1) The air cleaner 22, the air-cleaner-side pipe 32 and the fuel tank 19 can be efficiently assembled and installed by mounting the air cleaner 22 and the air-cleaner-side pipe 32 on the seat plate 34 to form the subassembly A1, mounting the subassembly A1 on the upper surface of the fuel tank 19 to form the device-assembly A2 and installing the device-assembly A2 into the installation space S2.

(2) Setting the subassembly A1 at the first position apart from the radiator 14 allows the installation of the device-assembly A2 into the installation space S2 to be easily performed while surely avoiding the interference of the device-assembly A2 with the radiator 14. Furthermore, thereafter displacing the subassembly A1 to the second position apart from the oil feeding portion 19*a* prevents the subassembly A1 from hindering fuel feeding. The device-assembly A2 can be thus installed efficiently and easily while involving no enlargement of the installation space S2 and avoiding the interference of the air-cleaner-side-pipe 32 and the seat plate 34 of the subassembly A1 with the radiator 14.

(3) According to the embodiment, the side bracket 38 protrudes downward beyond the lower surface of one end of the seat plate 34 while extending in the direction of the displacement of the subassembly A1; the subassembly A1 is mounted on the upper surface of the fuel tank 19 in the state where the side bracket 38 and the one end of the seat plate 34 protrude outside the upper surface of the fuel tank 19; and the side bracket 38 is allowed to be fixed to the right side surface of the fuel tank 19 either of the first and second positions: these enable the side bracket 38 to support the protruding part of the mounted subassembly A1 outside the upper surface of the fuel tank 19 and make the fixing of the subassembly A1 at each of the first and second positions be reliable.

(4) According to the embodiment, the air cleaner 22 is oriented so that the exhaust port thereof faces a side opposite to the engine 13; the air-cleaner-side pipe 32 includes the end portion connected to the exhaust port, the returning portion 32*a* extending from the end portion to the outer-peripheral-surface-side of the air cleaner 22 toward the engine-13-side along the air cleaner 22, and the straight-line portion 32*b* from the distal end of the returning portion 32*a* to the engine-13-side along the air cleaner 22; and the air-cleaner-pipe 32 is mounted on the seat plate 34 in the state where at least a part of the straight-line portion 32*b* of the air-cleaner-side pipe 32 is located in the space S between the cylindrical outer peripheral surface 24*a* of the main body 24 of the air cleaner 22 and the upper surface of the seat plate 34: these allows the total width size W2 of the pipe 32 and the air cleaner 22 to be small in spite that the air-cleaner-side pipe 32 includes the returning portion 22*b*. This enables the subassembly A1 and hence the device-assembly A2 to be compact and enables the installation thereof into the installation to be facilitated. Besides, utilizing the space T, which is originally a dead space, as a space for piping the straight-line 32*b* results in a high space-utilization efficiency.

(5) The shape of the cross section of the straight-line portion 32*b*, being substantially right-angled triangle shape including the vertical side portion Z and the hypotenuse portion Y at least a part of which is inserted into the space S, allows the straight-line portion 32*b* to wedge into the space S in a great depth, thus allowing the protrusion dimension $\alpha$ shown in FIG. 9 when the air cleaner 22 is viewed from above to be small. This allows the total width size W2 of the assembly of the air cleaner 22 and the air-cleaner-side pipe 32 to be further reduced, thus making the small-sizing of the subassembly A1 and the device-assembly A2 and the facilitation in the installation thereof be more effective.

(6) The air-cleaner-side pipe 32, being an integrated molded product with the continuous integration of the air-cleaner-side pipe 32 and the straight-line portion 32*b* with each other, allows the above width size to be possibly reduced without difficulty, as compared with an air-cleaner-side pipe formed of a flexible hose and bent in a U-shape. Furthermore, the protrusion size of the returning portion 32*a* in the length direction of air cleaner 22 also can be reduced, which is particularly advantageous when the space is limited also in the length direction of the air cleaner 22.

The present invention is, however, not limited to the above-described embodiment but permitted include, for example, the following embodiments.

(a) The shape of the cross section of the straight-line portion 32*b* in the air-cleaner-side pipe is not limited to one including respective side portions X, Y and Z. For example, the vertical side portion Z and the bottom side portion X may be changed into an arc-shaped portion. This configuration also permits the total width size of the pipe and the air cleaner to be reduced by the arrangement of the straight-line portion 32*b* with the insertion of at least a part of the hypotenuse portion Y into the space T. The air-cleaner-side pipe, alternatively, may have a circular cross section over a whole length of the air-cleaner-side pipe. Thus shaped air-cleaner-side pipe also can have a reduced width size with the insertion of at least a part of the straight-line portion of the air-cleaner-side pipe into the space. In this case, the air-cleaner-side pipe may be a flexible hose bent in a U-shape, instead of a plastic molded product and the like.

(b) The means for permitting the displacement of the subassembly between the first and second positions is not limited to the combination of the long-aperture 35 provided in the seat plate 34 and the bolt 37 screwed into the boss 36 on the upper surface of the fuel tank 19 through the long-aperture 35 in the above embodiment. The displacement is also permitted, for example, by the combination of a bracket having a long-aperture and provided at an upper-surface-side of the fuel tank, a screwed hole provided in the seat plate, and a bolt screwed into the screwed hole with engagement with the long-aperture. In this case, fixing the seat plate at the first and second positions can be performed by another fixing member, for example, means for fixing in the side bracket 38 in the embodiment or at a plurality of positions including one in the side bracket 38.

(c) In the invention, the first and second structures as obstacles to the installation of the device-assembly are not limited to the radiator 14 and the oil feeding portion 19*a*, respectively. The first and second structures may be variably defined in accordance with a lay-out of circumstance equipment thereof and the like, and the subassembly A1 can be modified according to the structures.

(d) While the device-assembly A2 in the embodiment is formed of the subassembly A1 and the fuel tank 19, the assembly according to the invention may be mounted on an upper surface of a device other than a fuel tank, such as a hydraulic fluid tank, to form a device-assembly.

(e) The present invention can be applied to not only an excavator but also various construction machines configured by utilization of the excavator, similarly to the above embodiments.

As described above, the present invention provides a construction machine including an air cleaner and a pipe therefor, the construction machine allowing the air cleaner and the pipe to be efficiently installed while they are interposed between a plurality of obstacles while surely avoiding the interference the air cleaner or the pipe with the obstacles. The provided construction machine includes: an engine; an air cleaner having an exhaust port and configured to filter air taken in by the engine; a pipe connected to the exhaust port of the air cleaner; a seat plate on which the engine, the air cleaner and the pipe are mounted to form a subassembly; a device including an upper surface on which the subassembly is mounted and configured to form, in cooperation with the installed subassembly, a device-assembly to be installed in a predetermined installation space; a fixing member for fixing the subassembly to the device. One of the seat plate and the surface of the device is provided with an aperture extending in a specific length direction and the other of the seat plate and the surface of the device is provided with a fit-in portion to be fitted into the aperture so as to be capable of relative displacement to the aperture in the length direction. The length direction is such a direction that the relative displacement of the fit-in portion to the aperture in the length direction allows the subassembly to be displaced between a first position and a second position, the first position being farther from a first structure (e.g., a radiator), which is an obstacle to the installation of the subassembly into the installation space, and being closer to a second structure other than the first structure, than the second position. The fixing member has both of a first fixing mode of fixing the subassembly to the device at the first position and a second fixing mode of fixing the subassembly to the device at the second position.

In the above construction machine, the air cleaner, the pipe and the device can be efficiently assembled and installed by mounting the air cleaner and the pipe on the common seat plate to form the subassembly, mounting the subassembly on the upper surface of the fuel tank to form the device-assembly and installing the device-assembly into the installation space. In addition, setting the subassembly at the first position apart from the first structure (e.g., a radiator 14) allows the installation of the device-assembly into the installation space to be easily performed while surely avoiding the interference of the device-assembly with the first structure. Thereafter, displacing the subassembly to the second position apart from the second structure (e.g., an oil feeding portion of a fuel tank) enables the subassembly to be prevented from hindering the use of the first structure.

The construction machine according to the invention, in a preferable embodiment thereof, further includes: a lower travelling body; an upper slewing body mounted on the lower travelling body so as to be slewable and including an upper frame as a base; an engine room provided on a rear portion of the upper frame to accommodate the engine as a power source and related equipment to the engine; a cabin provided on one of a right front portion and a left front portion of the upper frame, wherein: the device is a fuel tank; the device-assembly is installed in the installed space between the engine room and the cabin; the first structure is a structure located in the engine room so as to be close to and opposed to the subassembly installed in the installation space; and the second structure is an oil feeding portion protruding beyond the upper surface of the fuel tank.

According to the above preferable embodiment, the device-assembly, which is formed by mounting the air cleaner on the fuel tank, is allowed to be installed between the engine room and the cabin easily while involving no interference of the device-assembly with a structure, for example, a radiator. After the installation, the subassembly can be prevented from hindering fuel feeding by the displacement thereof to locate the subassembly far from the oil feeding portion of the fuel tank.

It is preferable that: the fixing member includes a side bracket extending in a direction of the displacement of the subassembly and protruding beyond a lower surface of one end of the seat plate; the subassembly is configured to be mounted on the upper surface of the device in a state where the one end of the seat plate and the side bracket protrude outside the upper surface of the device; and the side bracket is configured to be fixed onto a side surface of the device at each of the first and second positions. The side bracket, in the state where the subassembly is mounted so as to make the one end of the subassembly protrude outside the upper surface of the device, for example, so as to deviate an evacuator of the air cleaner from the upper surface of the device, can support the protruding part and ensure the fixing of the subassembly at each of the first and second positions.

It is preferable that: the air cleaner has a cylindrical outer peripheral surface and is oriented so that the exhaust port of the air cleaner faces an opposite side to the engine; the pipe includes an end portion connected to the exhaust port, a return portion extending from the end portion toward an engine-side, and a downstream-side portion extending from a distal end of the returning portion to the engine side along the air cleaner; and the air cleaner is mounted on the seat plate so as to locate at least a part of the downstream-side portion in a space between the cylindrical outer peripheral surface of the air cleaner and the upper surface of the seat plate. The pipe, though including the returning portion, allows the pipe and the air cleaner to have a small width size, thereby enabling the subassembly and hence the device-assembly to be compact and enabling the installation of the device-assembly into the installation space to be facilitated. Moreover, utilizing the space, which is originally a dead space, as a part of a space for piping the downstream-side portion enhances a space-utilization efficiency.

For the configuration, the downstream-side portion of the pipe preferably has a substantially-triangle-shaped cross section including a hypotenuse portion at least a part of which is located in the space. The shape of the cross section allows the subassembly to have a further reduced size to make the size-reduction and the facilitation in the installation be more effective.

Specifically, the cross section of the downstream-side portion of the pipe is preferably shaped as a substantial right-angled triangle further including a vertical side portion to be opposed to the first structure. The shape of the cross section allows the total width size of the pipe and the air cleaner to be more reduced and thereby enables the downstream-side portion to be compactly arranged with no difficulty.

The pipe is, preferably, a molded product involving an integration of the returning portion and the straight-line portion with each other. The pipe thus formed as an integrally molded product (for example, a plastic injection molded product) allows the total width size of the pipe and the air cleaner to be small without difficulty, for example, as compared with a width size of a flexible hose bent in a U-shape. Furthermore, it is also possible to reduce a protrusion size of the returning portion in the air cleaner length direction, which is particularly advantageous when a space is also limited in the length direction of the air cleaner.

This application is based on Japanese Patent application No. 2013-239424 filed in Japan Patent Office on Nov. 20, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine comprising:

an engine;

an air cleaner having an exhaust port and configured to filter air taken in by the engine;

a pipe connected to the exhaust port of the air cleaner, the pipe including a fitting seat;

a seat plate provided as a single plate member on which the air cleaner and the pipe are mounted to form a subassembly;

a device including an upper surface on which the subassembly is mounted, the device being configured to form, in cooperation with the installed subassembly, a device-assembly to be installed in a predetermined installation space;

a fixing member for fixing the subassembly to the device, wherein:

the seat plate comprises a single upper surface, the single upper surface including an air cleaner mounting portion and a pipe mounting portion, the air cleaner being fastened to the air-cleaner mounting portion, the fitting seat of the air-cleaner-side pipe being fastened to the pipe mounting portion;

one of the seat plate and the surface of the device is provided with an aperture extending in a specific length direction and the other of the seat plate and the surface of the device is provided with a fit-in portion to be fitted into the aperture so as to be capable of relative displacement to the aperture in the length direction;

the length direction is such a direction that the relative displacement of the fit-in portion to the aperture in the length direction allows the subassembly to be displaced between a first position and a second position, the first position being farther from a first structure, which is an obstacle to the installation of the subassembly into the installation space, and being closer to a second structure other than the first structure, than the second position; and the fixing member has both of a first fixing mode of fixing the subassembly to the device at the first position and a second fixing mode of fixing the subassembly to the device at the second position.

2. The construction machine according to claim 1, further comprising:

a lower travelling body;

an upper slewing body mounted on the lower travelling body so as to be slewable and including an upper frame as a base;

an engine room provided on a rear portion of the upper frame to accommodate the engine as a power source and related equipment to the engine; and a cabin provided on one of a right front portion and a left front portion of the upper frame, wherein:

the device is a fuel tank; the device-assembly is installed in the installed space between the engine room and the cabin; the first structure is a structure located in the engine room so as to be close to and opposed to the subassembly installed in the installation space; and the second structure is an oil feeding portion protruding beyond the upper surface of the fuel tank.

3. The construction machine according to claim 1, wherein:

the fixing member includes a side bracket extending in a direction of the displacement of the subassembly and protruding beyond a lower surface of one end of the seat plate;

the subassembly is configured to be mounted on the upper surface of the device in a state where the one end of the seat plate and the side bracket protrude outside the upper surface of the device; and the side bracket is configured to be fixed onto a side surface of the device at each of the first and second positions.

4. A construction machine comprising:

an engine;

an air cleaner having an exhaust port and configured to filter air taken in by the engine;

a pipe connected to the exhaust port of the air cleaner;

a seat plate on which the air cleaner and the pipe are mounted to form a subassembly;

a device including an upper surface on which the subassembly is mounted, the device being configured to form, in cooperation with the installed subassembly, a device-assembly to be installed in a predetermined installation space;

a fixing member for fixing the subassembly to the device, wherein:

one of the seat plate and the surface of the device is provided with an aperture extending in a specific length direction and the other of the seat plate and the surface of the device is provided with a fit-in portion to be fitted into the aperture so as to be capable of relative displacement to the aperture in the length direction;

the length direction is such a direction that the relative displacement of the fit-in portion to the aperture in the length direction allows the subassembly to be displaced between a first position and a second position, the first position being farther from a first structure, which is an obstacle to the installation of the subassembly into the installation space, and being closer to a second structure other than the first structure, than the second position; and the fixing member has both of a first fixing mode of fixing the subassembly to the device at the first position and a second fixing mode of fixing the subassembly to the device at the second position, the air cleaner has a cylindrical outer peripheral surface and is oriented so that the exhaust port of the air cleaner faces an opposite side to the engine; the pipe includes an end portion connected to the exhaust port, a return portion extending from the end portion toward an engine-side, and a downstream-side portion extending from a distal end of the returning portion to the engine side along the air cleaner; and the air cleaner is mounted on the seat plate so as to locate at least a part of the downstream-side portion in a space between the cylindrical outer peripheral surface of the air cleaner and the upper surface of the seat plate.

5. The construction machine according to claim 4, wherein the downstream-side portion of the pipe has a substantially-triangle-shaped cross section including a hypotenuse portion at least a part of which is located in the space.

6. The construction machine according to claim 5, wherein the cross section of the downstream-side portion of the pipe is shaped as a substantial right-angled triangle further including a vertical side portion to be opposed to the first structure.

7. The construction machine according to claim 4, wherein the pipe is a molded product involving an integration of the returning portion and the straight-line portion with each other.

* * * * *